United States Patent [19]

Hermann et al.

[11] Patent Number: 4,472,338

[45] Date of Patent: Sep. 18, 1984

[54] METHOD OF PRODUCING POLYAMIDE FOILS

[75] Inventors: Karl H. Hermann; Helmut Schulte; Werner Nielinger, all of Krefeld; Dietrich Michael, Leverkusen, all of Fed. Rep. of Germany

[73] Assignee: Bayer Aktiengesellschaft, Leverkusen, Fed. Rep. of Germany

[21] Appl. No.: 365,407

[22] Filed: Apr. 5, 1982

[30] Foreign Application Priority Data

Apr. 9, 1981 [DE] Fed. Rep. of Germany ....... 3114390

[51] Int. Cl.³ .............................................. D01F 1/02
[52] U.S. Cl. .................................. 264/210.6; 264/211; 428/220
[58] Field of Search ............................ 264/211, 210.6; 428/220

[56] References Cited

U.S. PATENT DOCUMENTS

| 3,405,211 | 10/1968 | Cancio | 264/211 |
|---|---|---|---|
| 3,560,421 | 2/1971 | Cox | 264/211 |
| 3,857,804 | 12/1974 | Glatti et al. | 428/220 |
| 3,867,249 | 2/1975 | Vitale et al. | 428/220 |
| 3,966,857 | 6/1976 | Charlton | 264/211 |
| 3,995,084 | 11/1976 | Berger et al. | 428/220 |
| 4,012,478 | 3/1977 | Horikawa et al. | 264/211 |
| 4,013,622 | 3/1977 | Dejuneus | 264/211 |
| 4,217,324 | 8/1980 | Meek | 264/211 |

FOREIGN PATENT DOCUMENTS

| 2450776 | 5/1976 | Fed. Rep. of Germany . | |
| 49-13930 | 4/1974 | Japan | 264/211 |
| 5052319 | 5/1975 | Japan | 264/211 |
| 137214 | 10/1980 | Japan | 264/211 |
| 387710 | 2/1933 | United Kingdom | 264/211 |

OTHER PUBLICATIONS

Plastics Engineering, Oct. 1975, pp. 51 and 53.

*Primary Examiner*—James H. Derrington
*Attorney, Agent, or Firm*—Connolly and Hutz

[57] ABSTRACT

A method of producing polyamide foils by extrusion wherein a dispersion of a solid inorganic nucleating agent is added to the polyamide.

6 Claims, No Drawings

METHOD OF PRODUCING POLYAMIDE FOILS

Foils of polyamides, in particular of poly-ε-caprolactam or of copolyamides based on ε-caprolactam, are distinguished by numerous outstanding properties, such as great mechanical strength, transparency and brilliance, as well as being resistant to fats, oils and low temperatures. By virtue of these advantageous properties they are widely used for the production of packaging material.

For economic reasons, there is great interest in producing extremely thin polyamide foils, i.e. having a thickness of from 10 to 30 μm. With the known conventional processes (German Offenlegungsschrift No. 2,450,776), only foils having a thickness of at least 25 μm may be produced by a technically satisfactory production, but even then only at a relatively low draw off rate, namely of the most 50 meters per minute.

It has now surprisingly been found that polyamide foils may be produced having a thickness of from 10 to 50 μm, preferably from 15 to 25 μm, by a foil extrusion process at draw off rates of more than 50 meters per minute if polyamide-6 or copolyamides comprising at least 80% by weight, of ε-caprolactam units are mixed with from 0.001 to 0.2% by weight, preferably from 0.002 to 0.1% by weight, based on the polyamide, of a dispersion consisting of:

(1) from 1 to 50% by weight, preferably from 2 to 40% by weight based on the dispersion, of at least one solid inorganic nucleating agent; and (2) from 50 to 99% by weight, preferably from 60 to 98% by weight, based on the dispersion, of at least one liquid organic dispersing agent suitable for the nucleating agent.

Suitable inorganic nucleating agents include those known for nucleating polyamide, such as barium sulphate, tricalcium phosphate, $CaF_2$ and talcum. The nucleating agents should have an average particle size of less than 25 μm, preferably less than 20 μm.

The following are examples of suitable dispersing agents for the nucleating agents:

(a) Polyalkylene glycols corresponding to the following general formula:

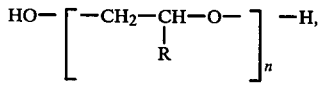

wherein

R represents H or $CH_3$; and n represents an integer of from 3 to 100.

The preferably used glycol is a polyethylene glycol having a molecular weight of from 300 to 1,000.

Other suitable dispersing agents are:

(b) Paraffin oils; or (c) Esters of mono- or di-carboxylic acids and monofunctional alcohols corresponding to the following general formula:

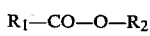

or

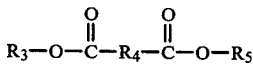

wherein $R_1$, $R_2$, $R_3$ and $R_5$ represent saturated or unsaturated aliphatic groups preferably having from 1 to 20 carbon atoms, cycloaliphatic groups preferably having 5 or 6 carbon atoms, aromatic groups preferably having from 6 to 10 carbon atoms or aromatic aliphatic groups preferably having from 7 to 12 carbon atoms;

$R_4$ represents a saturated or unsaturated alkylene group preferably having from 2 to 10 carbon atoms, a cycloalkylene group preferably having from 6 to 10 carbon atoms or an arylene group preferably having from 6 to 10 carbon atoms;

wherein $R_1$ and/or $R_2$ or $R_3$ and/or $R_5$ contain at least 8 aliphatic carbon atoms, e.g. butyl stearate, hexyl stearate, isodecyl stearate, isononyl stearate, benzyl stearate, cyclohexyl stearate, isooctyl oleate, diisooctyl adipate, diisodecyl sebacate, diisooctadecyl isophthalate, methyl stearate, butyl palmitate, isononyl behenate, dodecyl acetate, dodecyl butyrate, isooctadecyl butyrate, isooctadecyl benzoate, n-octadecyl butyrate, n-octadecyl stearate, isooctadecyl stearate, isooctadecyl behenate, isooctadecyl oleate, isooctadecyl linolate, diisooctadecyl adipate, diisooctadecyl sebacate, diisooctadecyl terephthalate, diisooctadecyl sebacate, diisooctadecyl terephthalate, di-n-octadecyl adipate, di-n-octadecyl sebacate, diisodecyl phthalate, diisooctadecyl phthalate, diisooctadecyl oxalate, diisooctadecyl succinate, di-n-octadecyl oxalate, decane dicarboxylic acid diisononyl esters or decane dicarboxylic acid diisooctadecyl esters or esters of saturated or unsaturated aliphatic monocarboxylic acids having at least 12 carbon atoms and polyfunctional alcohols, e.g. hexane diol-bis-stearate, hexane triol-monooleate, diethylene glycol-bis-stearate, trimethylol propane-tris-palmitate, ethylene glycol-bis-stearate, ethylene glycol-bis-behenate, 2,2-dimethyl-propane diol-bis-palmitate, 2,2-dimethyl-propane diol-bis-oleate, glycerol-tris-stearate, glycerol-tris-palmitate, glycerol-tri-behenate, glycerol-bis-behenate, trimethylol propane-bis-behenate, pentaerythritol-tetrakis-stearate, pentaerythritol-tri-behenate, pentaerythritol-bis-behenate, glycerol nonooleate-bis-stearate or trimethylol propane-monooleate-monobehenate;

The following are also suitable as dispersing agents:

(d) predominantly linear organopolysiloxanes corresponding to the following general formula:

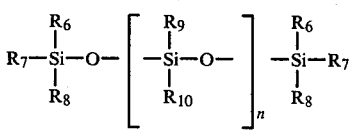

wherein $R_6$, $R_7$, $R_8$, $R_9$ and $R_{10}$ each represent H, an alkyl group having from 1 to 18 carbon atoms, a cycloalkyl group having from 6 to 10 carbon atoms or an aryl group having from 6 to 10 carbon atoms; and n represents an integer of from 50 to 1,000, e.g. liquid polydimethyl siloxanes or polymethyl phenyl siloxanes having a viscosity of at least 100 mPas at 20° C.;

(e) alkoxylation products of fatty alcohols corresponding to the following general formula:

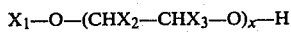

wherein $X_1$ represents a saturated or unsaturated, preferably straight-chained, alkyl group having at least 12 carbon atoms;

$X_2$ represents hydrogen or an alkyl group having from 1 to 3 carbon atoms;

$X_3$ represents hydrogen or an alkyl group having from 1 to 3 carbon atoms; and x represents an integer of from 1 to 50; or (f) Alkoxylation products of fatty acids corresponding to the following general formula:

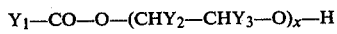

wherein $Y_1$ represents a saturated or unsaturated, preferably straight-chained, alkyl group having at least 12 carbon atoms;

$Y_2$ represents hydrogen or an alkyl group having from 1 to 3 carbon atoms;

$Y_3$ represents hydrogen or an alkyl group having from 1 to 3 carbon atoms; and x represents an integer of from 1 to 50;

Also the following dispersing agents:

(g) Alkoxylation products of alkyl phenols corresponding to the following general formula:

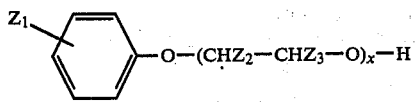

wherein $Z_1$ represents a saturated or unsaturated alkyl group having at least 9 carbon atoms;

$Z_2$ represents hydrogen or an alkyl group having from 1 to 3 carbon atoms;

$Z_3$ represents hydrogen or an alkyl group having from 1 to 3 carbon atoms; and x represents an integer of from 1 to 50; or (h) Alkylation products of fatty acid amides corresponding to the following general formula:

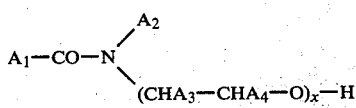

wherein $A_1$ represents a saturated or unsaturated, preferably straight-chain, alkyl group having at least 12 carbon atoms;

$A_2$ represents hydrogen, a substituted or unsubstituted alkyl, cycloalkyl, aryl or aralkyl group or a group corresponding to the following general formula:

$(CHA_3—CHA_4—O)_y—H;$ $A_3$ represents hydrogen or an alkyl group having from 1 to 3 carbon atoms;

$A_4$ represents hydrogen or an alkyl group having from 1 to 3 carbon atoms; and x and y each represents an integer of from 1 to 50; or (i) Alkoxylation products of fatty amines corresponding to the following general formula:

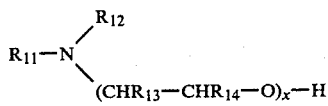

wherein $R_{11}$ represents a saturated or unsaturated, preferably straight-chain, alkyl group having at least 12 carbon atoms;

$R_{12}$ represents hydrogen, a substituted or unsubstituted alkyl, cycloalkyl, aryl or aralkyl group or a group corresponding to the following general formula:

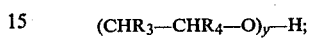

$R_{13}$ represents hydrogen or an alkyl group having from 1 to 3 carbon atoms;

$R_{14}$ represents hydrogen or an alkyl group having from 1 to 3 carbon atoms; and x and y each represents an integer of from 1 to 50.

Alkoxylation products of the following compounds are mentioned as examples illustrating the classes of compunds (e) to (i):

| | | |
|---|---|---|
| 1 mol of dodecylamine | and | 10 mol propylene oxide |
| 1 mol of hexadecylamine | and | 10 mol ethylene oxide |
| 1 mol of octadecylamine | and | 10 mol ethylene oxide |
| 1 mol of octadecylamine | and | 5 mol propylene oxide |
| 1 mol of octadecylamine | and | 20 mol ethylene oxide |
| 1 mol of octadecylamine | and | 10 mol butylene oxide |
| 1 mol of N—methyl-octadecylamine | and | 10 mol ethylene oxide |
| 1 mol of N—cyclohexyl-octadecylamine | and | 10 mol ethylene oxide |
| 1 mol of N—cyanoethyl-octadecylamine | and | 20 mol ethylene oxide |
| 1 mol of N,N—bis-(octadecyl)-amine | and | 10 mol ethylene oxide |
| 1 mol of eikoxylamine | and | 10 mol ethylene oxide |
| 1 mol of hexadecylalcohol | and | 5 mol propylene oxide |
| 1 mol of octadecyl alcohol | and | 10 mol ethylene oxide |
| 1 mol of palmitic acid | and | 10 mol ethylene oxide |
| 1 mol of stearic acid | and | 5 mol ethylene oxide |
| 1 mol of stearic acid | and | 10 mol propylene oxide |
| 1 mol of stearic acid | and | 20 mol propylene oxide |
| 1 mol of behenic acid | and | 10 mol ethylene oxide |
| 1 mol of oleic acid | and | 10 mol ethylene oxide |
| 1 mol of linoleic acid | and | 10 mol ethylene oxide |
| 1 mol of p-nonyl-phenol | and | 5 mol ethylene oxide |
| 1 mol of p-nonyl-phenol | and | 30 mol ethylene oxide |
| 1 mol of m-pentadecyl-phenol | and | 20 mol propylene oxide |
| 1 mol of m-pentadecyl-phenol | and | 10 mol ethylene oxide |
| 1 mol of p-dodecyl-phenol | and | 20 mol ethylene oxide |
| 1 mol of coconut oil fatty acid amide | and | 2 mol ethylene oxide |
| 1 mol of stearic acid amide | and | 5 mol ethylene oxide |
| 1 mol of stearic acid-N—methylamide | and | 5 mol ethylene oxide |
| 1 mol of behenic acid amide | and | 10 mol ethylene oxide |
| 1 mol of oleic acid amine | and | 5 mol ethylene oxide. |

The dispersion is prepared by conventional methods, e.g. by mixing the two components, using stirrers or dissolvers, and then working-up the mixture to a stable dispersion. This working-up is carried out either in a wet mill, e.g. a stirrer mill, ball mill, corundum disc mill, toothed colloid mill, "ultra-Turrax" dispersing apparatus or a vibratory mill, or using a single roll or multi-roll mill.

The dispersion is preferably added to the polyamide granulate and mixed therewith by means of the conventional mixing apparatus, such as double cone mixers, high speed mixers, mixing screws, tumbler mixers or paddle wheel mixers.

Suitable polyamides for carrying out the process according to the present invention, apart from polyamide-6 include copolyamides obtained by the polycondensation or polymerisation of at least 80% by weight, of ε-caprolactam and not more than 20% by weight, of one or more other known polyamide-forming monomers.

Examples of such polyamide-forming monomers include other lactams, such as lauric lactam, ω-amino acids, such as 11-amino-undecanoic acid, and mixtures of equivalent quantities of one or more dicarboxylic acids, such as adipic acid, sebacic acid, azelaic acid, isophthalic acid or terephthalic acid and one or more diamines, such as hexamethylene diamine, 3-aminomethyl-3,5,5-trimethyl-cyclohexylamine, 4,4'-diamino-dicyclohexyl methane, 4,4'-diamino-dicyclohexyl propane-(2,2,), m-xylylene diamine, 2,2,4-trimethyl-hexamethylene diamine and 2,4,4-trimethyl-hexamethylene diamine. The relative viscosity of the polyamides, determined on a 1% solution of the polyamide in m-cresol at 25° C., should be at least 3.2, preferably at least 3.4.

The polyamides may be prepared by the known hydrolytic or activated anionic polymerisation of the monomers in apparatus operating batch-wise or continuously, e.g. autoclave or VK-condensers. Any residue of monomers and/or oligomers may optionally be removed by vacuum distillation of the polyamide melt or by extraction of the granulate obtained from the polyamide melt, e.g. by means of hot water.

By further condensation of the polyamide granulate in the solid state at temperatures of from 1° to 100° C., preferably from 5° to 50° C. below the melting point of the polyamide, the relative viscosity may be raised to the value desired.

The machine used for production of the foils are advantageously single shaft extruders having a single 3-zone screw or high power screws fitted with shearing and mixing elements. The total length of the screw should be at least 20 D=diameter (200 cm), preferably at least 24 D. The operating temperature may be from 200° to 300° C., preferably from 250° to 280° C.

The film extruded through a conventional broad sheeting die is transferred to a cooled casting roll where it solidifies and strengthens and it is then drawn off as a foil over deflecting rollers at a rate of more than 50 meters per minute to be rolled up or carried away for further processing. The temperature of the casting roller is from 80° to 130° C., depending on the thickness of the foil.

The process according to the present invention combines the possibility of producing extremely thin foils having a thickness of from 10 to 50 μm, preferably from 15 to 25 μm, with the possibility of high draw off rates of more than 50, preferably 55 to 180 m/min, most preferably from 80 to 150 m/min. The thin foils produced by this method are distinguished by the ability to lie flat, the low tendency thereof to stick to the casting roller, the stability of the web of foil under tension during subsequent processing, e.g. when the foils are laminated or printed, and exceptional dimensional stability during interim storage. They are also highly transparent and have a high surface gloss.

The following mixtures were prepared, using a conventional double cone mixer:

Mixture A: 99.975% by weight of poly-ε-caprolactam in the form of a conventional granulate having a relative viscosity of 3.55 (determined as described above), 0.025% by weight of a dispersion consisting of 20% by weight of a talcum having a particle size below 10 μm and 80% by weight of a polydimethyl siloxane having a viscosity of 440 mPas at 20° C., prepared using a conventional single roll mill.

Mixture B: 99.97% by weight of poly-ε-caprolactam as used in mixture A, 0.03% by weight of a dispersion consisting of 35% by weight of a talcum having a particle size below 10 μm and 65% by weight of a polyethylene glycol having an average molecular weight of 400, prepared using a ball mill stirrer.

Mixture C: 99.96% by weight of poly-ε-caprolactam as used in mixture A, 0.04% by weight of a dispersion consisting of 25% by weight of a talcum having a particle size below 10 μm and 75% by weight of isodecyl stearate prepared using a ball mill stirrer.

Mixture D: 99.96% by weight of poly-ε-caprolactam as used in mixture A, 0.04% by weight of a dispersion consisting of 25% by weight of a talcum having a particle size below 10 μm and 75% by weight of an ethoxylated stearylamine prepared using a vibratory mill.

Mixture E: 99.95% by weight of poly-ε-caprolactam as in mixture A, 0.05% by weight of a dispersion consisting of 20% by weight of a talcum having a particle size below 10 μm and 80% by weight of a paraffin oil having a viscosity of 37.8/5.05 mPas/E at 20° C., prepared using a ball mill.

Mixture F: 99.96% by weight of poly-ε-caprolactam as in mixture A, 0.04% by weight of a dispersion consisting of 25% by weight of a talcum having a particle size below 10 μm and 75% by weight of diisononyl adipate prepared using an Ultra-Turrax ® mixer.

Mixture G: 99.95% by weight of poly-ε-caprolactam as used in mixture A, 0.05% by weight of a dispersion consisting of 20% by weight of a talcum having a particle size below 10 μm and 80% by weight of the alkoxylation product of a $C_{12}$–$C_{18}$ fatty alcohol and ethylene oxide (molar ratio 1:5) prepared using a ball mill stirrer.

Mixture H: 99.95% by weight of poly-ε-caprolactam as used in mixture A, 0.05% by weight of a dispersion consisting of 20% by weight of a talcum having a particle size below 10 μm and 80% by weight of the alkoxylation product of p-nonylphenol and ethylene oxide (molar ratio 1:8), prepared using a ball mill stirrer.

Mixture I: 99.95% by weight of poly-ε-caprolactam as used in mixture A 0.05% by weight of a dispersion consisting of 20% by weight of a talcum having a particle size below 10 μm and 80% by weight of the alkoxylation product of a coconut oil fatty acid amide and ethylene oxide (molar ratio 1:6) prepared using a ball mill stirrer.

Mixture K: 99.94% by weight of poly-ε-caprolactam as used in mixture A, 0.06% by weight, of a dispersion consisting of 25% by weight of calcium fluoride having a particle size below 15 μm and 75% by weight of a polyethylene glycol having an average molecular weight of 400 prepared using a ball mill stirrer.

EXAMPLE 1

Flat sheet foils were prepared from Mixtures A to K, using a single shaft extruder having the following specification:
Diameter (D): 4½ inches
Length: 28 D Screw: Intake zone 9D; compression zone 4D; first metering zone 11D; mixing zone 2D; second metering zone 2D.
Width of broad sheeting die (Johnson type): 1550 mm
Temperatures of the cylinder heating means; starting from the intake zone: 250° C., 260° C., 265° C., 265° C.
Adaptor and broad sheeting die: 260° C.
Speed of rotation of screw: 40 revs/min.

Foils 17 μm in thickness could easily be drawn off and rolled up at a take off rate of 100 m/min. The foils were highly transparent and had a brilliant surface. The foil packages showed no creases even after prolonged storage.

EXAMPLE 2

Flat sheet foils were produced from Mixtures A to K, using a single shaft extruder characterised by the following specification:
Diameter (D): 90 mm
Length 30 D
Screw: intake zone 10D; compression zone 4D; first metering zone 10D; mixing zone 0.5D; second metering zone 5.5 D.
Width of broad sheeting die (Johnson type): 1550 mm
Temperatures of the cylinder heating means, starting from the intake zone: 200° C., 260° C., 260° C., 260° C.
Adaptor and broad sheeting die: 255° C.
Speed of rotation of screw: 94 revs/min.

Foils 15 μm in thickness could easily be drawn off and rolled up at a take off rate of 150 meters per minute. The foils were highly transparent and had a brilliant surface. The foil packages showed no creases even after prolonged storage.

We claim:

1. A method of producing polyamide foils or films having a thickness of from 15 to 25 μm by a foil extrusion process at a draw off rate of 55 to 180 meters per minute, wherein polyamide-6 or a copolyamide-6 containing at least 80% by weight of -caprolactam units is mixed with from 0.001 to 0.2% by weight based on the polyamide, of a dispersion consisting of:
   (1) from 1 to 50% by weight of at least one solid inorganic nucleating agent for polyamides; and
   (2) from 50 to 99% by weight of at least one liquid organic dispersing agent suitable for the nucleating agent.

2. A method as claimed in claim 1, wherein the dispersing agent is a member of the groups consisting of polyalkylene glycols, paraffin oils, carboxylic acid esters, organopolysiloxanes, alkoxylated fatty alcohols, alkoxylated alkyl phenols, alkoxylated fatty acids, alkoxylated fatty acid amides and alkoxylated fatty amines.

3. A method as claimed in claim 2, wherein the polyalkylene glycols corresponding to the general formula

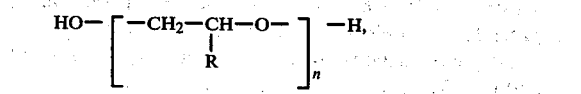

wherein
R represents H, or CH$_3$; and
n represents an integer of from 3 to 100;
the esters of mono- or di-carboxylic acids and monofunctional alcohols correspond to the general formula

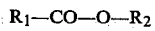

or

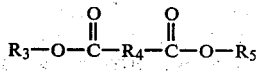

wherein
R$_1$, R$_2$, R$_3$ and R$_5$ each represent a saturated or unsaturated aliphatic group preferably having from 1 to 20 carbon atoms, a cycloaliphatic group preferably having 5 or 6 carbon atoms, an aromatic group preferably having from 6 to 10 carbon atoms or an aromatic aliphatic group preferably having from 7 to 12 carbon atoms;
R$_4$ represents a saturated or unsaturated alkylene group preferably having from 2 to 10 carbon atoms, a cycloalkylene group preferably having from 6 to 10 carbon atoms or an arylene group preferably having from 6 to 10 carbon atoms, wherein R$_1$ and/or R$_2$ or R$_3$ and/or R$_5$ contain at least 8 aliphatic carbon atoms;
the polysiloxanes correspond to the general formula:

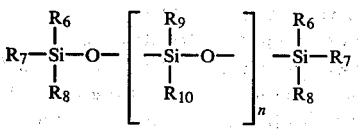

wherein
R$_6$, R$_7$, R$_8$, R$_9$ and R$_{10}$ each represent H, an alkyl group having from 1 to 18 carbon atoms, a cycloalkyl group having from 6 to 10 carbon atoms or an aryl group having from 6 to 10 atoms; and
n represents an integer of from 50 to 1,000;
the alkoxylation products of fatty alcohols correspond to the following general formula:

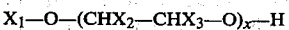

wherein
X$_1$ represents a saturated or unsaturated, preferably straight-chained, alkyl group having at least 12 carbon atoms;
X$_2$ represents hydrogen or an alkyl group having from 1 to 3 carbon atoms;
X$_3$ represents hydrogen or an alkyl group having from 1 to 3 carbon atoms; and
x represents an integer of from 1 to 50;
the alkoxylation products of fatty acids correspond to the general formula:

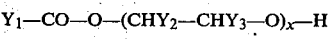

wherein
Y$_1$ represents a saturated or unsaturated, preferably straight-chained, alkyl group having at least 12 carbon atoms;
Y$_2$ represents hydrogen or an alkyl group having from 1 to 3 carbon atoms;
Y$_3$ represents hydrogen or an alkyl group having from 1 to 3 carbon atoms; and
x represents an integer of from 1 to 50;
the alkoxylation products of alkyl phenols correspond to the general formula:

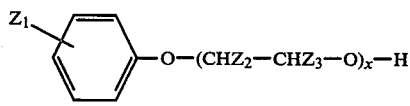

wherein
- $Z_1$ represents a saturated or unsaturated alkyl group having at least 9 carbon atoms;
- $Z_2$ represents hydrogen or an alkyl group having from 1 to 3 carbon atoms;
- $Z_3$ represents hydrogen or an alkyl group having from 1 to 3 carbon atoms; and
- x represents an integer of from 1 to 50;

the alkoxylation products of fatty acid amides correspond to the general formula:

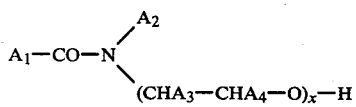

wherein
- $A_1$ represents a saturated or unsaturated, preferably straight-chain, alkyl group having at least 12 carbon atoms;
- $A_2$ represents hydrogen, a substituted or unsubstituted alkyl, cycloalkyl, aryl or aralkyl group or a group corresponding to the following general formula:

- $A_3$ represents hydrogen or an alkyl group having from 1 to 3 carbon atoms;
- $A_4$ represents hydrogen or an alkyl group having from 1 to 3 carbon atoms; and
- x and y each represent an integer of from 1 to 50; and the alkoxylation products of fatty amines corresponding to the following general formula:

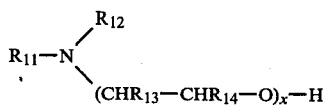

wherein
- $R_{11}$ represents a saturated or unsaturated, preferably straight-chain, alkyl group having at least 12 carbon atoms;
- $R_{12}$ represents hydrogen, a substituted or unsubstituted alkyl, cycloalkyl, aryl or aralkyl group or a group corresponding to the following general formula:

- $R_{13}$ represents hydrogen or an alkyl group having from 1 to 3 carbon atoms;
- $R_{14}$ represents hydrogen or an alkyl group having from 1 to 3 carbon atoms; and
- x and y each represent an integer of from 1 to 50.

4. A method as claimed in claim 1, wherein the dispersion consists of from 2 to 40% by weight of the component (1) and from 60 to 98% by weight of the component (2).

5. A method as claimed in claim 1, wherein 0.002 to 0.1% by weight of the dispersion are mixed with the polyamide.

6. A method as claimed in claim 1, wherein as nucleating agent barium sulphate, tricalcium phosphate, $CaF_2$ or talcum are used.

* * * * *